Feb. 7, 1928.
C. W. A. KOELKEBECK
1,658,602
CHAIN
Filed Dec. 26, 1924
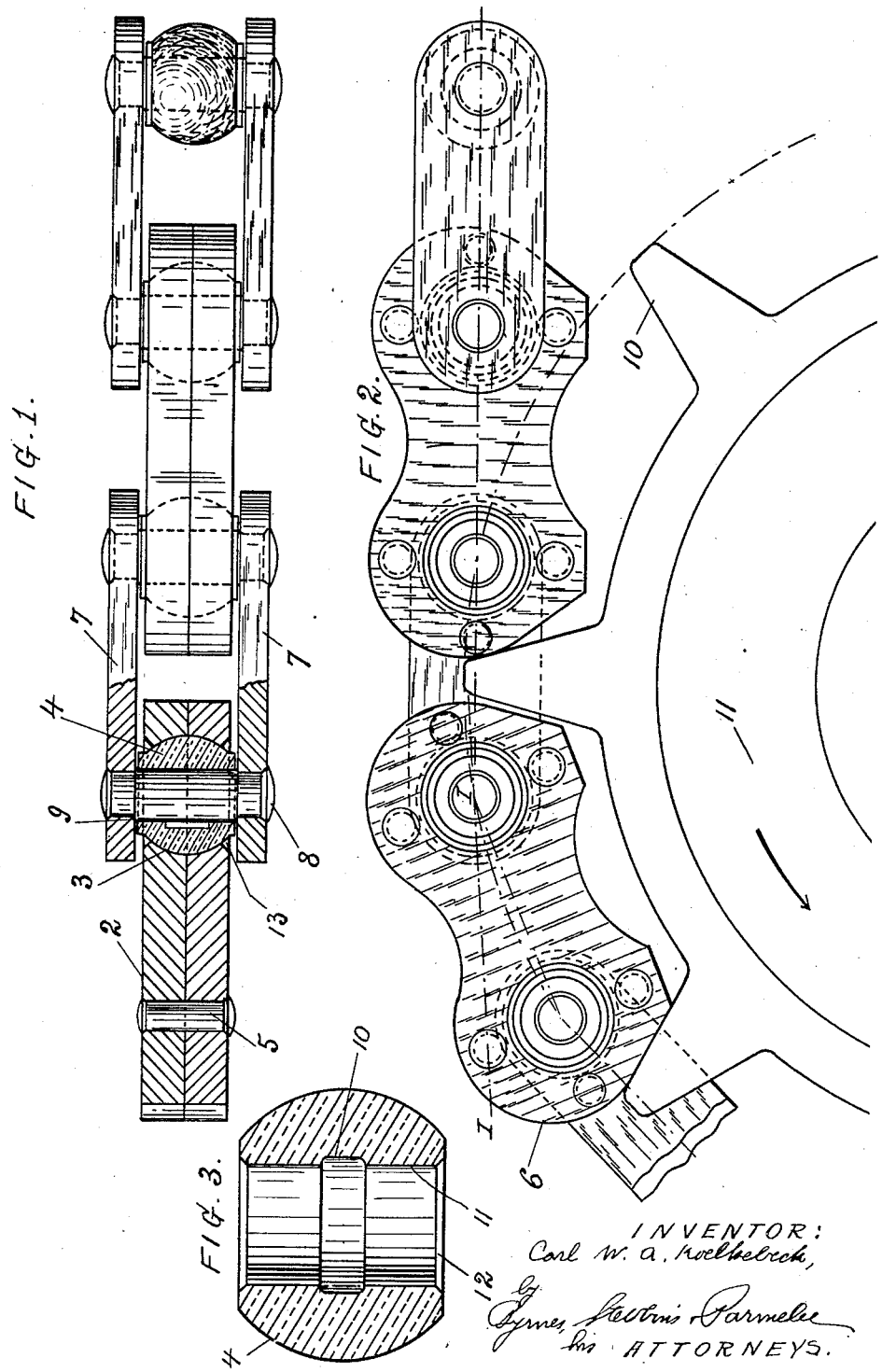
INVENTOR:
Carl W. A. Koelkebeck,
by Byrnes, Stebbins & Parmelee
his ATTORNEYS.

Patented Feb. 7, 1928.

1,658,602

UNITED STATES PATENT OFFICE.

CARL W. A. KOELKEBECK, OF PITTSBURGH, PENNSYLVANIA.

CHAIN.

Application filed December 26, 1924. Serial No. 758,106.

The present invention relates broadly to power transmitting devices, and more particularly to power transmitting chains, and especially chains of the general character ordinarily referred to as "silent" chains, although certain features of construction of the invention may advantageously be embodied in chains of other types.

At the present time it is customary to construct so-called silent chains by assembling a plurality of links in such manner as to produce chains of any desired width. These chains are customarily driven, of necessity, by straight tooth sprocket wheels. In larger installations it is impractical, due not only to the difficulties encountered in the manufacture, but also to the expense involved, to form shrouded sprocket wheels of this character. It is well recognized in the art, however, that during use the chains may tend to move sidewise on the sprocket wheels and it has heretofore been necessary to construct the chains with special or supplemental links or plates serving merely for the purpose of preventing such lateral movement. This also adds to the cost of the chain and increases the size thereof without imparting any particularly desirable features as to strength or flexibility of the chain.

The present invention has for one of its objects the provision of a chain of this general character, so constructed as to obviate the necessity of shrouded sprocket wheels or of employing any additional links or plates having for their sole purpose the retaining of the chain against such lateral movement. These desirable features are effected by so constructing the chain that the links constituting part of the driving chain proper serve not only the function of transmitting the load but also serve the function of preventing such undesirable movement.

It is further desirable in chains of this general type to provide as much flexibility as possible. Ordinarily, however, the flexibility in chains as heretofore constructed for this purpose has been obtained solely by a relative rotational movement of adjacent links on the connecting pins provided therebetween.

It is a further object of the present invention to provide a so-called silent chain having materially greater flexibility by so interconnecting the links that a true universal movement therebetween is possible, this movement being of the type obtained by permitting movement about three mutually intersecting axes all extending substantially at right angles to each other, and thereby distinguished from the movement ordinarily obtained in the so-called "universal" joint which is limited to movement about two mutually intersecting axes of this character. In this respect I have taken advantage of certain features of the invention disclosed in my Patent No. 1,512,609 granted October 21, 1924, the present invention incorporating in a unitary structure not only the advantageous features of such a chain but also the ability to prevent any lateral movement, as before described.

In the accompanying drawings I have shown, for purposes of illustration only, certain preferred embodiments of the present invention, it being understood that the drawings do not define the limits of my invention, as changes in the construction, operation and assembly of the parts therein disclosed may be made without departing either from the spirit of the invention or the scope of my broader claims.

In the drawings:

Figure 1 is a top plan view, partly broken away and partly in section, illustrating a length of chain embodying certain features of the present invention, the sectional part of the figure being along the line I—I of Figure 2;

Figure 2 is a side elevation of a chain constructed in accordance with Figure 1 in position on a sprocket wheel, certain of the parts being removed in this figure for the sake of clearness; and Figure 3 is a detail sectional view, on an enlarged scale, illustrating a preferred form of bushing for use in a chain of the character shown in Figures 1 and 2.

In carrying out the present invention, I preferably provide links 2 each having formed in each end thereof a portion of a spherical bearing surface 3, these surfaces being adapted to cooperate when the links are assembled as shown in Figure 1 to accurately engage the spherical bearing surface of a bushing 4. These links are preferably substantially the outline shown in Figure 2, thereby providing widened portions adjacent each end insuring a distribution of metal at all points for maximum strength. At the same time, the widened portions provide sufficient metal to permit the formation of rivet openings therein adapted to receive rivets 5, the center lines of rivets on opposite sides of the bearing surface 3 preferably lying in a plane passing through the center line of the bushing 4. I have also found that this disposition of metal enables me to utilize a third rivet located in each end of the links 2, these rivets preferably lying in a plane common to the axis of rotation of the bushings 4 in both ends of the links.

There are also provided side links 7 which may be of the general configuration shown in Figure 2 and adapted to lap over adjacent pairs of links 2. The links are held in assembled relation by hardened steel bearing pins 8 of any desired construction. These pins, however, are preferably of as small diameter as possible consistent with the load to be transmitted by the chain and are preferably formed with shoulders 9 adjacent each end thereof to maintain the links 7 in predetermined rigid spaced relationship to prevent any binding on the sides of the links 2 or on the flattened ends of the bushings 4. After the links have been assembled, the ends of the pins may be riveted over in accordance with present practices in the art.

With a chain of the character described herein it will be apparent from an inspection of Figure 2 that the teeth 10 on the sprocket wheel 11 with which the chain is used may project upwardly into the space between the ends of adjacent pairs of links 2 to effect the desired driving engagement or driven engagement with the chain. When in this position, any lateral movement of the chain is positively prevented by reason of the location and construction of the links 7, which links extend downwardly over the sides of a substantial portion of each of the teeth of the sprocket wheel in contact with the chain. This makes it unnecessary to provide any supplemental means for preventing lateral movement of the chain, the links 7 serving the dual purpose of power transmitting links and retaining member.

As the chain passes around the periphery of the sprocket wheels 11 with which it cooperates, the relative movement between the links takes place mainly about the pins 8, this being necessarily true because of the small radius of these pins as compared to the corresponding radius of the bushings 4. It frequently happens, however, that chains of this character are called upon to provide a further movement such as necessitated by shafts which are non-parallel and non-intersecting, such a movement being generally that required to twist the chain about its mean longitudinal axis. All such movement is taken up entirely between the links 2 and the surface of the bushings 4, the links 2 tending to turn about their longitudinal axes on the spherical surface of the bushings 4, thereby entirely relieving the pins 8 of any twisting or torsional strains and insuring a condition in which the pins at all times present truly cylindrical bearing surfaces. It further happens in certain installations that the axes of rotation of adjacent sprockets are such that they are not only non-parallel but that if extended they would intersect. Such a condition requires a relative side movement between adjacent links, and this movement is also accommodated by the bushings 4 which bushings permit adjacent links to assume angular positions with respect to each other. This operation again relieves the pins 9 from any stresses such as they are ordinarily subjected to where bushings 4 are not provided.

From the foregoing it will be apparent that the present chain embodies features of construction permitting universal movement of the character represented by movement about any one of three mutually intersecting axes. This insures maximum flexibility, together with the advantageous features of operation before set forth. In addition, it provides in operation for the distribution of wear between two bearing surfaces, the distribution being such that the pins 8 are relieved from any twisting, and further being such that the friction between the parts during the normal operation of the chain is reduced to a minimum, it being clearly understood in the art that the friction between pivotally connected bodies decreases in proportion to the decrease in the radius of the pivot about which the turning movement occurs. As the pins 8 may be constructed with relatively small diameters, it becomes apparent that the normal friction between the parts represented by the normal operation is minimized to as great an extent as possible. Furthermore, as these pins can have an accurately machined surface, the coefficient of friction can further be reduced to an almost negligible quantity between the pins and the interiors of the bushings 4.

As clearly shown in Figure 3 of the drawings, each of the bushings 4 may be constructed from spherical bodies by removing portions from diametrically opposite sides thereof, as indicated in this figure. The bushings may thereafter be drilled to provide the bearing surfaces for the pins 8 and may also be shaped to provide lubricant containing recesses 10 insuring a supply of lubricant at all times. The ends of the bearing surface 11 for the pins 8 may be slightly filleted as indicated at 12, if desired, and the side edges of the links 2 where they intersect the periphery of the bushings 4 may be cut away as shown at 13 in Figure 1 to prevent any binding on the bushings 4 or scratching of the surface thereof.

It is also of importance in the present invention to consider the action of the bushings 4 on the links 2, this action being of such nature as to tend to spread the links. This action is effectively resisted by the rivets 5 and 6, the location of these rivets being such that maximum holding efficiency is insured. This is necessarily true for the reason that the rivets 5 are located on opposite sides of the center line of the pins 8 and the rivets 6 are located directly on the line of the centers of the pins 8 and in the line of load transmission through the links.

The present chain construction provides a compound inner link carried by spherical bushings, tending to exert a spreading action on the links. This spreading action is effectively resisted by rivets spaced a distance at least equal to the pitch of the links. In the illustrated embodiment, the rivets on opposite sides of the bushings are spaced a distance exactly equal to the pitch of the compound inner links and the rivets in the ends of the compound links are spaced a distance greater than the pitch. The ends of the compound inner links are shaped in accordance with standard requirements of chains of this character to effectively operate directly with the teeth on the sprocket wheels to thereby effect the so-called silent drive. The spherical bushings in turn are mounted on pins carried by spaced outside links, preventing lateral movement of the chain.

The advantages of the present invention arise from the provision of a chain of the so-called silent type, so constructed as to prevent any lateral movement between the sprocket wheels and the chain.

Further advantages arise from the provision in a chain of this nature of means insuring maximum flexibility.

Still other advantages arise from the shape of the links 2, thereby providing a distribution of metal insuring uniform maximum strength and enabling a location of securing rivets such that spreading of the links is effectively prevented.

I claim:

1. In a silent chain, an inner link having its ends on at least one side of the longitudinal axis of the chain flattened to cooperate with the teeth of a sprocket wheel throughout a substantial portion of the length of such teeth, a spherical bushing in each end of said link, outside links connecting adjacent inner links, and pins extending through said spherical bushings and carried by said outside links, substantially as described.

2. In a silent chain, an inner link having its ends on at least one side of the longitudinal axis of the chain flattened to cooperate with the teeth of a sprocket wheel throughout a substantial portion of the length of such teeth, a spherical bushing in each end of said link, outside links connecting adjacent inner links, and pins extending through said spherical bushings and carried by said outside links, each of said pins permitting relative movement between the links about an axis substantially normal to the axis of travel of the chain and said spherical bushing permitting relative movement between the links about intersecting axes substantially normal to each other and to said first mentioned axis, substantially as described.

3. A compound inner link for silent chains, comprising separable members having end portions on at least one side of the longitudinal axis of the chain flattened to engage the teeth of a driving sprocket throughout a substantial portion of the length of such teeth, spherical bushings in the ends of the link, and means holding the compound link assembled about said bushings, substantially as described.

4. In a silent chain, inner links having end portions on at least one side of the longitudinal axis of the chain flattened to cooperate with the teeth of a sprocket wheel throughout a substantial portion of the length of such teeth, outside links shaped to cooperate with the ends of the teeth of a sprocket wheel, and bearing members connecting said inner links and outside links, each of said bearing members comprising a pin and a bushing rotatable on said pin and provided with a spherical bearing surface cooperating with said inner links, substantially as described.

5. In a silent chain, inner links having end portions on at least one side of the longitudinal axis of the chain flattened to cooperate with the teeth of a sprocket wheel throughout a substantial portion of the length of such teeth, outside links shaped to cooperate with the ends of the teeth of a sprocket wheel, and bearing members connecting said inner links and outside links, each of said bearing members being constructed to provide relative movement between adjacent links about any one of three mutually intersecting axes, substantially as described.

In testimony whereof I have hereunto set my hand.

CARL W. A. KOELKEBECK.